Figure 1:
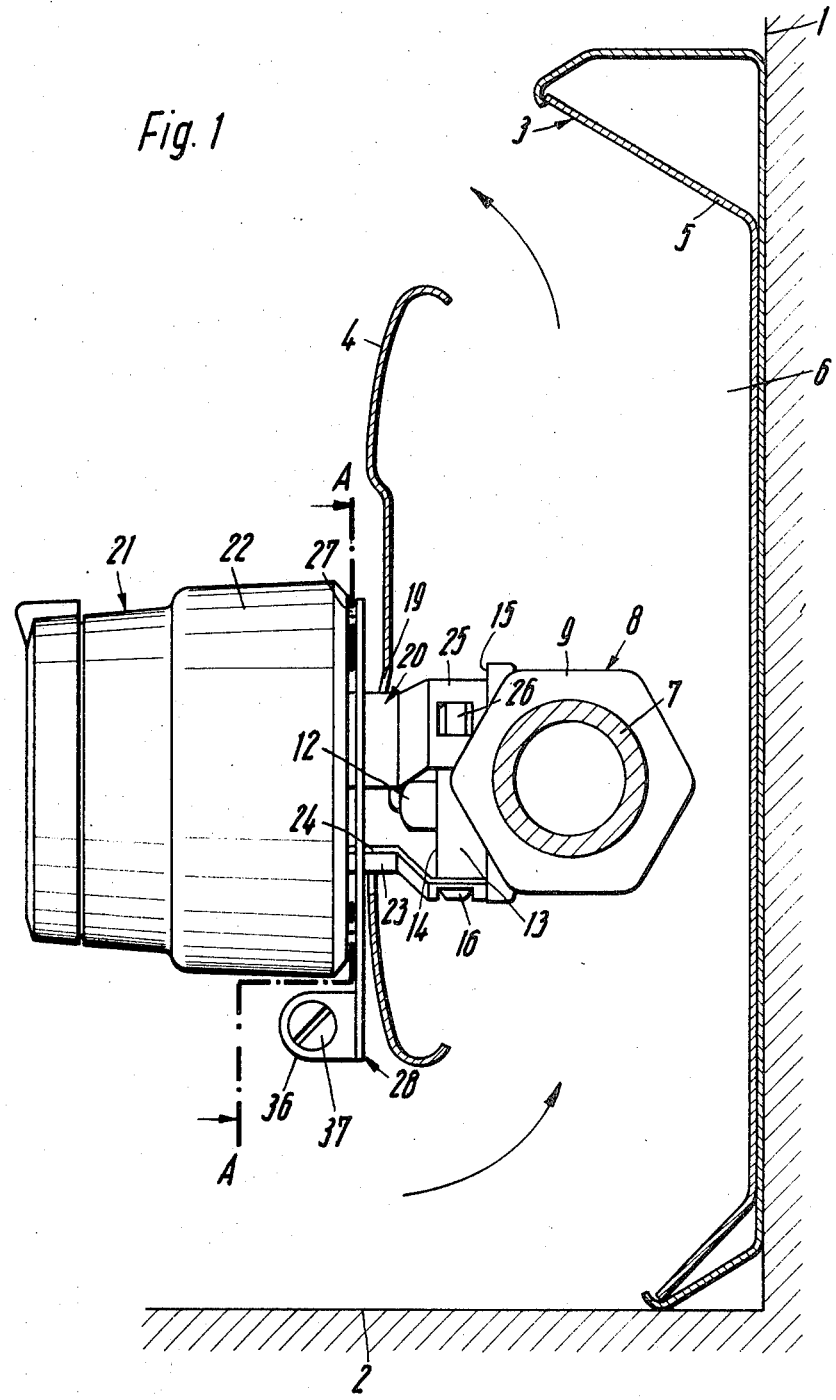

United States Patent [19]
Graversen et al.

[11] 3,735,776
[45] May 29, 1973

[54] VALVE FOR A HEATING ELEMENT

[75] Inventors: Niels P. G. Graversen, 6440 Augustenborg, Denmark; Carl Sorensen, deceased, late of Nordorg, Denmark by Inger Vorre Sorensen, administratrix

[73] Assignee: Danfoss A/S, Nordborg, Denmark

[22] Filed: June 28, 1971

[21] Appl. No.: 157,303

[30] Foreign Application Priority Data
June 12, 1970  Germany....................P 20 29 008.8

[52] U.S. Cl................................137/359, 236/42
[51] Int. Cl. ..............................................F24f 11/00
[58] Field of Search..................236/33, 41, 42, 99; 105/53, 54, 55, 67; 137/359, 360, 361; 251/291, 292

[56] References Cited
UNITED STATES PATENTS
3,149,782  9/1964  Grayson et al. .................236/33
2,157,770  5/1939  Mayo ................................236/34

Primary Examiner—Henry T. Klinksiek
Attorney—Wayne B. Easton

[57] ABSTRACT

The invention relates to a heating valve assembly in which a valve casing is positioned behind a convector housing and a thermostatic member is positioned in front of the convector housing. The thermostatic member carries a rotatable setting nob and has a short radially resilient base which can be snapped onto the neck of the valve casing which casing surrounds a valve spindle which is controllable by the setting knob.

4 Claims, 5 Drawing Figures

VALVE FOR A HEATING ELEMENT

The invention relates to a valve for a heating element, which is arranged behind a covering, e.g. the front wall of a convector housing.

Valves for covered heating elements can generally only be actuated if the covering is removed or if the valves are incorporated at a point along the heating pipe that is not covered.

Thermostatically actuated valves for heating elements are known which consist of a valve casing and an attachment which can be firmly connected thereto and which carries a thermostatic operating element and a rotatable setting knob. The attachment has a short radially resilient base which can be snapped on to the neck of the case that surrounds the valve spindle and can be immobilized by means of a clamping device surrounding the base at the neck. The use of valves of this kind has not hitherto been possible on covered heating elements.

The object of the invention is to provide a valve for covered heating elements which can be easily adjusted from the outside and which, in particular, can be a thermostat valve.

According to the invention, this object is achieved by the valve consisting of a valve case which is adapted to be fitted behind the covering, and of an attachment which is adapted to be fitted in front of the covering, by providing on the attachment a radially resilient base which is adapted to be passed through a hole in the covering and is of such length that it can be snapped on to the neck of the case surrounding the valve spindle, and by fitting a clamping device around the base between the rear end of the attachment and the front face of the valve case at a point which lies in front of the covering after assembly.

In this construction, there is provided in front of the covering an attachment which is firmly mechanically connected to the valve case, constitutes a reliable guide for a rotatable knob or the like located in front of the covering, and can, in particular, contain a thermostatic operating element. The hole in the covering can be small and completely covered by the attachment. The two-part nature of the valve enables the covering to be fitted in the normal way. All the steps necessary for ensuring a firm mechanical connection between the two parts of the valve can be carried out in front of the covering. The snap-on action is achieved by axial movement of the attachment; by means of the clamping device disposed outside the covering, the spring characteristics of the base are reduced in such manner that it is no longer possible to pull off the attachment. The clamping device, positioned between the rear end of the attachment and the covering, is not only readily accessible, but discernible during any dismantling that may be necessary, so that removal of the attachment itself causes no difficulties in the absence of appropriate directions for doing this.

The base can consist of several and preferably three individual strips. In this way, it is possible to obtain in a particularly simple manner the radial resilience necessary for the snap-on action and to reduce this resilience by means of the clamping device.

Each strip constituting the base expediently contains at least one hole which receives a projection on the side wall of the neck in the snapped-on position. Thus, the attachment is secured on the valve case in a manner whereby it cannot rotate relatively thereto at all. In this arrangement, the projection should have an inclined surface on the front side and a further steeper inclined surface on the rear side. Both inclined surfaces ensure that the attachment occupies an accurately predetermined axial position when the clamping device is tightened up. The difference in the steepness of the inclined surfaces makes it easier to push the attachment on than to pull it off.

In many cases it is desireable for the attachment to be able to occupy a number of different positions in the circumferential direction, in relation to the valve case, e.g. so that a fixed scale marking can occupy a specific position irrespective of the arrangement of the valve case behind the covering. In this connection, it is advantageous if each of three strips forming the base contains holes offset from each other by 30°, and two of the projections are offset 15° from that axis of the valve at right-angles to the valve spindle. In this way, a large number of positions are provided between the attachment and the valve case.

In a preferred embodiment, the base has a portion of reduced diameter between its snap-on ends and the attachment. This enables the base to be passed through the hole in the covering and then to be displaced in the plane of the covering in the event that the valve spindle is not concentric with the hole.

A particularly favorable construction results if the resilient strips forming the base extend over a considerable part of their length into the attachment. In particular, the part of these strips located within the attachment can be of approximately the same length as the part positioned outside the attachment. The strips will therefore initially have considerable radial resilience. This resilience is reduced to a very great extent by the clamping device which engages the strips intermediate their ends or even precisely halfway along their length.

A special advantage accrues if the strips forming the base are of curved cross-section at least over that portion positioned between the clamping device and the snap-on end. This form of cross-section makes the strips more rigid. It is therefore possible, using thinner material, to obtain the necessary radial resilience for effecting the snap-on action as well as the required rigidity after the clamping device has been tightly fitted.

The clamping device is advantageously provided with a locking arrangement which is positioned in the projection outside the attachment. A very flat clamping device can then be used, and the attachment can be positioned just in front of the covering, but the locking arrangement is nevertheless readily accessible.

In particular, the clamping device can be of substantially circular form with extensions at opposite sides; the first of these extensions projects as far as a point just short of the edge of the attachment, whereas the second projects beyond this edge for the purpose of accommodating the locking arrangement. The oppositely disposed projections serve as pull-off means when the attachment is to be withdrawn after the clamping device has been loosened. Furthermore, the extension remote from the locking arrangement can be used for facilitating movement of the clamping device.

A clamping device of this kind can for example be made of wire bent to the required shape. In a preferred arrangement however the locking device takes the form of a plate containing a hole surrounding the base, incisions extending from this hole into the extensions.

In contrast to other sheet-metal clamping devices, tension is in this case produced in the plane of the plate. The clamping device is very flat but nevertheless stable.

That extension of the plate projecting beyond the edge of the attachment can be divided and can carry tabs formed by bending over the material at the edges where the division is made. These tabs act as limiting stops and can accommodate a clamping screw.

Figure 2:
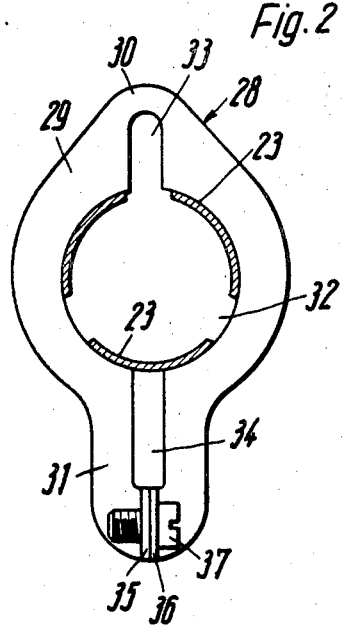
Figure 3:
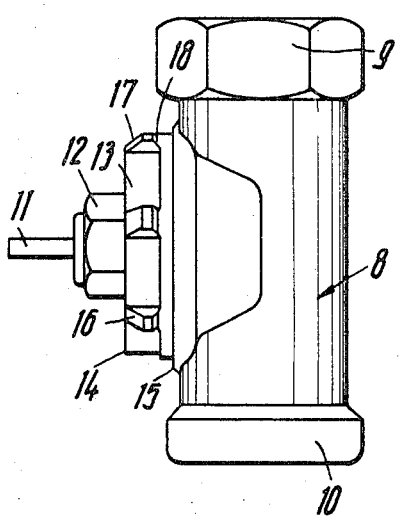
Figure 5:
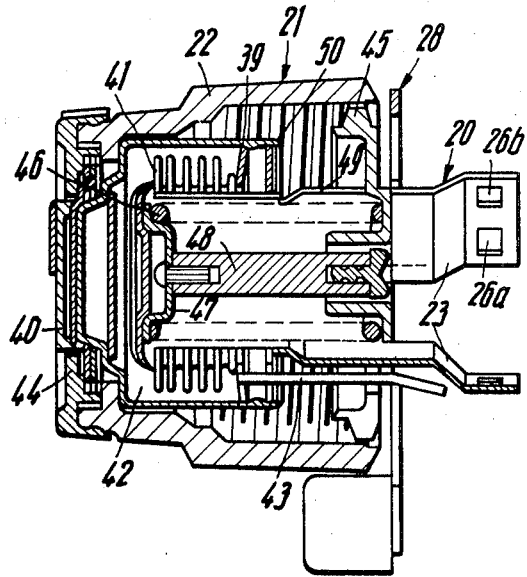
Figure 4:
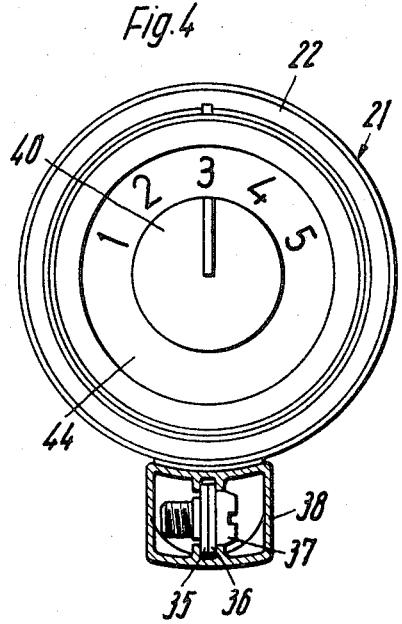

The invention will now be described in more detail by reference to embodiments illustrated in the drawing, in which:

FIG. 1 is a vertical section through a floor convector heating means, and shows a side view of a valve in accordance with the invention, FIG. 2 is a vertical section through the valve attachment and clamping device, on line A—A of FIG. 1, FIG. 3 is an underneath view of the valve case for a second embodiment, FIG. 4 is an end view of the valve attachment of the second embodiment, and shows a section thru the cover for the locking arrangement, and FIG. 5 is a vertical longitudinal section through the construction shown in FIG. 4.

A convector housing 3 is provided along the side wall 1 and on the floor 2 of a room. This housing has a front wall 4 and a rear wall 5, between which passes a flue. A heating pipe 7 is arranged in this flue so that air is drawn in from below and, after being heated, is discharged upwards in the direction of the arrows.

A valve case 8 having an inlet port 9 and an outlet port 10 is fitted in the heating pipe. A valve spindle 11 projects outwardly through a gland 12. The spindle is surrounded by a neck 13 which extends from an end face 14 to a shoulder 15, and is provided with a plurality of projections 16. Each projection 16 has an inclined face 17 on its front side, and a further inclined face 18 on its rear side. The inclined face 18 is steeper than the inclined face 17.

The front wall 4 of the convector housing 3 contains a hole 19. Projecting through this hole is the base 20 of a thermostat attachment 21 which is provided on the outside with a rotatable knob 22. The base consists of three sheet-metal strips 23, which have an arcuate cross-section. Near the attachment 21, these strips have portions 24 of smaller diameter, and at their free ends portions 25 of greater diameter. The last-mentioned portions contain holes 26 by means of which the strips 23 can be sprung on to the projections 16 on the neck 13 of the valve case 8. This diameter is only slightly less than the diameter of the hole 19. The base 20 can therefore be passed through the hole 19 and then displaced in the plane of the wall 4 if the neck 13 is not exactly concentric with the center of the hole.

Between the rear end face 27 of the attachment 21 and the front end face 14 of the valve case 8, but still in front of the front wall 4, there is located a clamping device 28 which consists substantially of a metal plate 29. The plate is circular and has a first extension 30, which terminates below the attachment 21, and an oppositely disposed attachment 31, which projects laterally below the attachment 21. The plate 29 contains the circular hole 32 from which two incisions 33 and 34 extend. The hole 32 surrounds the strips 32 forming the base 20. At the end of the incision 34 two tabs 35 and 36 are bent up from the plate, and these can be drawn towards each other by a screw 37 until they abut. As shown in FIGS. 4 and 5, the tabs 35 and 36 as well as the clamping screw 37 can be enclosed in a cover 38, made for example of plastics material.

As can be seen from the longitudinal section shown in FIG. 5, the base 20 forms the extension of a core of the attachment, said core being solid with the case. This core consists substantially of a cup-shaped element 39 which is provided at its end face with a marking plate 40 and which, together with a bellows 41, forms an operating element 42 which is connected by way of a capillary tube 43 to a temperature sensor not illustrated. On its end face the rotatable knob 22 carries a scale plate 44, the scale cooperating with the mark on the marking plate 40. When the knob 22 is rotated, a bridge element 45, supporting a nominal-value spring 46, is axially displaced. Depending upon the strength of the spring and the pressure in the operating element 42, a plate 47, to which a spindle 48 is connected, is adjusted. This spindle presses on the valve spindle 11 and adjusts the valve.

Whereas in the embodiment shown in FIGS. 1 and 2, each of the strips 23 forming the socket contains only one hole 26, and only three projections 16 are provided, in the embodiment illustrated in FIGS. 3–5 two holes 26a and 26b, offset by 30°, are provided in the strips 23 forming the base, and the valve case has six projections 16. The projections are so arranged that a pair of them are offset by 15° from the valve axis at right-angles to the valve spindle 11. This ensures on the one hand that when a valve is arranged in the usual way the mark on the plate 40 points vertically upwards, and on the other hand that the attachment can be snapped on to the valve case in positions differing from each other by only 30°, so that adaptation to suit non-standard methods of fitting the valve is possible.

FIG. 5 also shows that a part 49 of each of the strips 23 extends well into the interior of the attachment 21 and that the strips only terminate near the free edge 50 of the cup-shaped element 39. The clamping device 28 therefore grips the strips 23 roughly mid-way along their total length. During the snap-on action, the strips have greater radial movement, but when the clamping device is tightened, the strips are immobilized in a reliable manner on the neck 13.

During assembly the valve case 8 is inserted in a heating pipe 7, and the front wall 4 of the convector housing 3 is then fitted. All that is then required is to push the attachment 21 together with its base 20 through the hole 19, until the holes 26 snap on to the projections 16. The screw 27 of the clamping device 28 is then tightened. The attachment 21 can now be firmly secured to the valve case exclusively by operations which can be carried out in front of the wall 4.

Conversely, it is only necessary to loosen the screw 37 for the purpose of removing the attachment 21. The attachment can then be withdrawn preferably by engaging the two extensions 30 and 31 of the plate 29.

We claim:

1. A heating valve assembly comprising a front wall member having a circular opening in a vertical plane, a valve casing on the inner side of said wall member and a thermostat attachment on the outer side of said wall member, said valve casing having a neck portion aligned with said wall member opening, fastening means attached to said thermostat attachment for fastening said thermostat attachment to said valve neck portion, said fastening means being extendable through said wall member opening and being radially resilient for resilient biasing engagement with said valve neck portion, and a clamping device surrounding said fastening means in clamping engagement therewith.

2. A heating valve assembly according to claim 1 wherein said valve neck portion has circumferentially spaced protuberances extending radially therefrom, said fastening means including a plurality of axially extending strips each having hole means at one end thereof for engagement with one of said neck portion protuberances.

3. A heating valve assembly according to claim 2 wherein each of said neck portion protuberances has a first inclined face on the side thereof adjacent said thermostat attachment and a second inclined face having a greater degree of incline on the far side thereof relative to said thermostat attachment.

4. A heating valve assembly according to claim 2 wherein the free ends of said strips are radially outwardly relative to the fixed ends thereof.

* * * * *